United States Patent
Yaron et al.

(10) Patent No.: US 9,652,146 B2
(45) Date of Patent: *May 16, 2017

(54) ERGONOMIC MOTION DETECTION FOR RECEIVING CHARACTER INPUT TO ELECTRONIC DEVICES

(71) Applicant: INPRIS INNOVATIVE PRODUCTS LTD, Efrat (IL)

(72) Inventors: Nissan Yaron, Efrat (IL); Ben Etzion Yaron, Efrat (IL)

(73) Assignee: INPRIS INNOVATIVE PRODUCTS LTD, Efrat (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/255,555

(22) Filed: Sep. 2, 2016

(65) Prior Publication Data

US 2016/0370989 A1    Dec. 22, 2016

Related U.S. Application Data

(63) Continuation of application No. 14/976,005, filed on Dec. 21, 2015, now Pat. No. 9,459,795, which is a
(Continued)

(51) Int. Cl.
    *G06F 3/041* (2006.01)
    *G06F 3/0488* (2013.01)
    *G06F 3/023* (2006.01)

(52) U.S. Cl.
    CPC ........ *G06F 3/04883* (2013.01); *G06F 3/0233* (2013.01); *G06F 3/0416* (2013.01); *G06F 3/04886* (2013.01); *G06F 2203/04104* (2013.01)

(58) Field of Classification Search
    CPC .................................................. G06F 3/04883
(Continued)

(56) References Cited

U.S. PATENT DOCUMENTS

| 5,642,108 A | 6/1997 | Gopher et al. |
| 6,570,557 B1 | 5/2003 | Westerman et al. |

(Continued)

FOREIGN PATENT DOCUMENTS

| WO | 2010/016065 | 2/2010 |
| WO | 2010/051452 | 5/2010 |

OTHER PUBLICATIONS

[Author unknown] How it works, Internal publication by Celluon, Inc. www.celluon.com, visited Mar. 31, 2011.
(Continued)

*Primary Examiner* — Jason Olson
(74) *Attorney, Agent, or Firm* — The Dobrusin Law Firm, P.C.

(57) ABSTRACT

Sliding and non-sliding touch input to an electronic device may be selected so that the motions associated with a character to input are intuitive and thus easy to remember. The motions for the contacts of the touch input may be selected ergonomically in a way enabling touch-typing, thus increasing user comfort for longer periods of use. Multiple repositionable finger contact regions are maintained on a contact surface in an arrangement that is easily accessible for the user's fingertips. Each available input character is associated with a unique finger contact or set of simultaneously-entered contacts, each contact being either sliding or non-sliding contact, and the sliding contacts having a direction associated with the character. One example touch surface is a touch screen. Another example touch surface is the table upon which the electronic device sets and thus separate from the electronic device and freeing space on the device for other use.

25 Claims, 5 Drawing Sheets

Related U.S. Application Data continuation of application No. 13/091,158, filed on Apr. 21, 2011, now Pat. No. 9,261,972.

(58) Field of Classification Search
USPC .......................................................... 345/173
See application file for complete search history.

(56) References Cited

U.S. PATENT DOCUMENTS

| | | |
|---|---|---|
| 7,030,861 B1 | 4/2006 | Westerman et al. |
| 2002/0160342 A1 | 10/2002 | Castro |
| 2007/0177804 A1 | 8/2007 | Elias et al. |
| 2008/0015115 A1 | 1/2008 | Guyot-Sionnest et al. |
| 2008/0320410 A1 | 12/2008 | Whytock et al. |
| 2009/0237361 A1 | 9/2009 | Mosby et al. |
| 2012/0212421 A1 | 8/2012 | Honji |
| 2013/0194201 A1 | 8/2013 | Zanone et al. |
| 2014/0160035 A1 | 6/2014 | Sauer et al. |

OTHER PUBLICATIONS

International Search Report and Written Opinion for Application No. PCT/IB2016/001256 dated Mar. 17, 2017.

| | | | |
|---|---|---|---|
| A = *___ | E = >>>_ | H = v_v_ | K = *v__ |
| B = _*__ | F = >>__ | I  = v___ | X = *^__ |
| C = __*_ | G = >_>_ | J  = _v__ | |
| D = ___* | | | |

| | | | S = <<__ |
|---|---|---|---|
| | M = vvv_ | O = **__ | Z = __>> |
| L = _>__ | W = ^^^_ | P = *_*_ | |
| T = __>_ | N = vv__ | Q = *__* | U = ^_^_ |
| | V = ^^__ | R = _**_ | Y = _^^_ |

"." = **** (or long press *___)

":" = __**

"," = ___<

"-" = ___>

Space = >___

Back Space = <___

Enter = ^^^^

* = non-sliding contact
> = slide right
< = slide left
^ = slide up
v = slide down

FIG. 2

Copy       Paste

Cut

Undo       Save

ERGONOMIC MOTION DETECTION FOR RECEIVING CHARACTER INPUT TO ELECTRONIC DEVICES

BACKGROUND

Known touch-sensitive surfaces, such as those used for touch screens when operating in certain modes, detect user contact at particular locations of the surface and interpret the contacts as character inputs. In many embodiments, the electronic devices that have touch-sensitive surfaces do not offer additionally a conventional keyboard, such as a QWERTY keyboard, as an input device. Accordingly, the size of the electronic device is conveniently reduced.

However, if the QWERTY keyboard is replaced by an image on the touch screen surface of the keys in the QWERTY pattern, a user finds it much more difficult to align his/her fingers with the keys than to align fingers to a keyboard. The user needs to constantly look at the screen key images, so replacing a QWERTY keyboard with an image of the keyboard on a touch screen becomes an uncomfortable way to input characters for an extended amount of time. The problem becomes even greater for visually-impaired users who would not be able to see the image of the virtual QWERTY keyboard.

As alternative to modeling QWERTY keyboards, some electronic devices distinguish between sliding and non-sliding finger contacts to discern character input. However, due to the number of characters that a user may want to input into an electronic device, such as enough for a complete alphabet, a large number of unique surface contacts, such as slide-up or slide-right, must be available to the user. The user is then faced with either the task of committing to memory a large number of unique motions (contacts) or frequently referencing a key to the motions, which if on a display of the electronic device limit the available screen space for other uses. Additionally, many times the motions are non-intuitive and uncomfortable for users, such as motions requiring users to twist their fingers and hands in unusual or unnatural positions.

Ideas to aid the "training phase" in which the user memorizes the motions for characters include associating characters with motions that resemble the character. For example, a circular motion may be associated with a zero or the letter "O" and a downward motion may be associated with a one or the letter "I." However, if all unique motions for input characters were to resemble the associated characters, many would be cumbersome, uncomfortable, and tiring for uses of long durations.

Accordingly, it would be desirable to have a form of touch input in which the contacts required for the input characters were relatively easy or intuitive to remember and also were comfortable, arranged in a way that enables true touch-typing and thus conducive to use for long periods of time. However, no such device, system, method for such touch input is known to the present inventor.

SUMMARY

The present invention provides an improved form of touch input to an electronic device. The contacts required for inputting characters can be selected to be intuitive and thus relatively easy to remember. The motions for the contacts may be selected ergonomically with no need to look at the screen, and thus enable a user to operate the electronic device comfortably for long periods of time.

The invention may be embodied as a touch screen assembly for a user to enter characters into an electronic device. The touch screen assembly has a processor, a touch screen having a touch-sensitive surface, and a memory storing instructions. When the instructions are executed by the processor, they cause the processor to: maintain multiple repositionable finger contact regions on the touch-sensitive surface, each finger contact region being associated with a separate finger of a user's hand and positioned relative to the other finger contact regions in an ergonomic arrangement enabling the user to simultaneously contact all finger contact regions with the associated fingers without moving the heal of the user's hand on or from a surface of the touch screen assembly or a surface maintained stationary with respect to the touch screen assembly; receive an indication of finger contact on at least one of the finger contact regions; receive an indication, for each finger contact, of which region received the finger contact and whether the finger contact was a sliding or a non-sliding contact; receive an indication of the direction of the sliding contact for each sliding contact; and maintain an association of each character of a complete alphabet with a unique finger contact or a unique set of simultaneously-entered two or more finger contacts. The processor uses the association of characters to finger contacts to recognize character input based on the indicated regions of finger contacts and the indications of sliding/non-sliding contact.

The invention may also be embodied as a method of analyzing human gestures to recognize character input to an electronic device. The method includes the following steps: discerning one or more finger contacts on one or more multiple finger contact regions on a first surface, each finger contact region associated with a separate finger of a user's hand and positioned relative to the other finger contact regions in an ergonomic arrangement enabling the user to simultaneously contact all finger contact regions with the associated fingers without moving the heal of the user's hand on or from a second surface that is maintained stationary with respect to the first surface; determining for each finger contact which finger contact region received the finger contact and whether the finger contact was a sliding or a non-sliding contact, the sliding contact not requiring the user to move the heal of the user's hand on or from the second surface; determining the direction of the sliding contact for each sliding contact; maintaining an association of each character of a complete alphabet with a unique finger contact or a unique set of simultaneously-discerned two or more finger contacts; and using the association of characters to finger contacts to recognize character input based on the indicated regions of finger contacts and the indications of sliding/on-sliding contact.

The invention may further be embodied as a machine readable storage medium containing instructions. When the instructions are executed they cause a processor of an electronic device to discern input characters by: receiving an indication of finger contact on one or more finger contact regions on a first surface, each finger contact region associated with a separate finger of a user's hand and positioned relative to the other finger contact regions in an ergonomic arrangement enabling the user to simultaneously contact all finger contact regions with the associated fingers without moving the heal of the user's hand on or from a second surface that is maintained stationary with respect to first surface; receiving an indication for each contacted region of which region or regions received a finger contact and whether the finger contact was a sliding or a non-sliding contact, the sliding contact not requiring the user to move the heal of the user's hand on or from the second surface; receiving an indication of the direction of the sliding contact for each sliding contact; maintaining an association of each character of a complete alphabet with a unique finger contact or a unique set of simultaneously-entered two or more finger contacts; and using the association of characters to finger contacts to recognize character input based on the indicated regions of finger contacts and the indications of sliding/non-sliding contact.

Embodiments of the present invention are described in detail below with reference to the accompanying drawings, which are briefly described as follows:

BRIEF DESCRIPTION OF THE DRAWINGS

The invention is described below in the appended claims, which are read in view of the accompanying description including the following drawings, wherein:

FIG. 2 provides an example of an association of characters of an alphabet to finger contacts in accordance with an embodiment of the invention;

DETAILED DESCRIPTION

The invention summarized above and defined by the claims below will be better understood by referring to the present detailed description of embodiments of the invention. This description is not intended to limit the scope of claims but instead to provide examples of the invention. Described first are electronic devices embodying the invention. Described next are methods of recognizing character input that embody the invention. After that storage media are described that embody the invention.

Figure 1A:
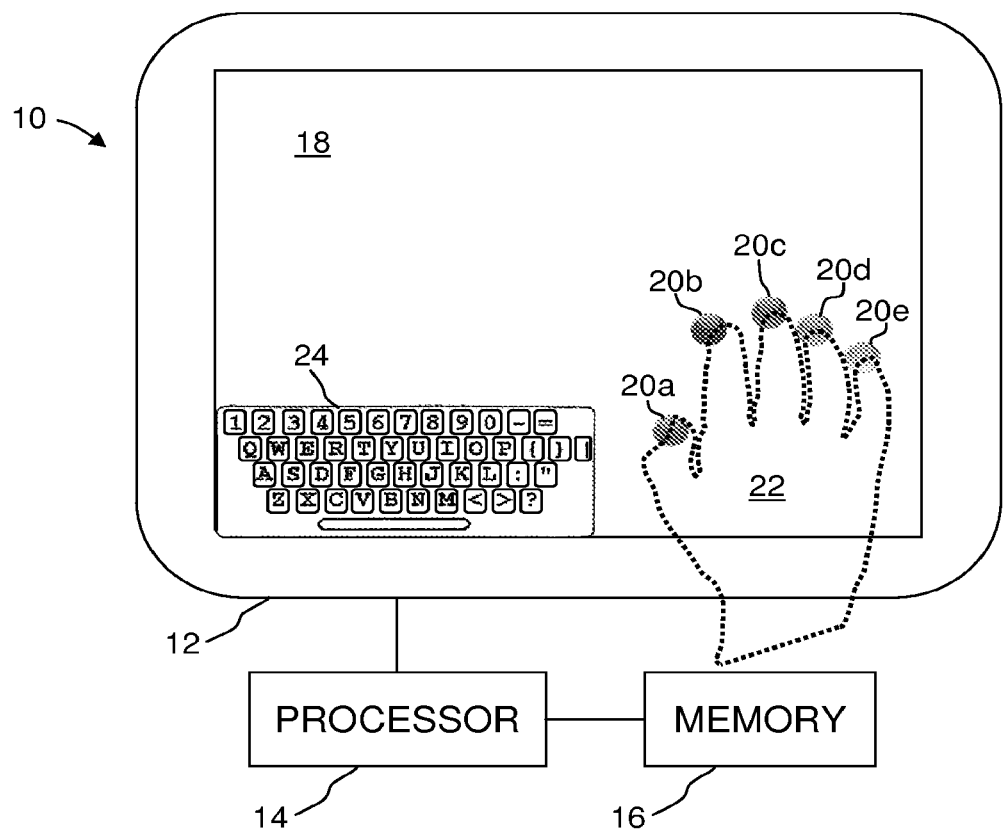
FIGS. 1a and 1b illustrate an example of the invention embodied as a touch screen assembly.

FIG. 1a illustrates an example of the invention embodied as a touch screen assembly 10. The touch screen assembly 10 of this example enables a user to enter characters into an electronic device, such as a personal computer, Smartphone, Tablet, home security devices (alarms), military machine monitors, electronic restaurant menus, and gaming devices (e.g., video games), as non-limiting examples. As shown in the drawing, the touch screen assembly 10 includes a touch screen 12, a processor 14, and a memory 16. As non-limiting examples, the processor 14 may be an Intel Core i7, a Xeon microprocessor, any processor of the Intel Core i7 Mobile Processor Family, or any ARM microprocessor used in a mobile telephone. The memory 16 may be a hard disk drive or a flash memory SSD (solid-state drive), as non-limiting examples.

The touch screen 12 has a touch-sensitive surface 18 that is sensitive to contact, such as direct contact from a user's finger (that is, the skin of the finger) or indirect contact from the user, such as from a gloved finger or the contact portion of a stylus. As will be described in more detail below, as the user contacts the touch-sensitive surface 18, the contact is sensed by the touch screen 12 and the processor 14 determines the two-dimensional location of the contact on the touch-sensitive surface 18. If the contact is a sliding contact, the processor 14 determines the two-dimensional direction of the sliding. The processor associates the user contact with a letter of an alphabet, and thus the touch screen 12 functions as an input device for the user.

Within the memory 16 software instructions are stored that, when executed by the processor 14, cause the processor 14 to analyze human gestures to recognize character input to the touch screen assembly 10. The processor 14 maintains multiple repositionable finger contact regions 20a-20e on the touch-sensitive surface 18. As shown in FIG. 1a, each finger contact region 20a-20e is associated with a separate finger of a user's hand 22 and positioned relative to the other finger contact regions in 20a-20e in an ergonomic arrangement that enables the user to simultaneously and comfortably contact all finger contact regions 20a-20e with the associated fingers without moving the heal of the hand 22 on or from a surface of the touch screen assembly 10 or a surface maintained stationary with respect to the touch screen assembly 10. An example of a surface maintained stationary with respect to the touch screen assembly 10 is the surface of a table upon which the touch screen assembly 10 rests, such that the heal of the user's hand is positioned close enough to the touch screen assembly 10 to enable the fingertips to contact the touch-sensitive surface 18. Alternatively, the user may prefer to rest the heal of his/her hand on a tray in front of his/her airline seat or on his thigh, if the touch screen assembly is resting on his/her lap.

The touch screen assembly 10 is configured so that the processor 14 receives an indication of finger contact on the finger contact regions 20a-20e, an indication of which of the finger contact regions 20a-20e received the finger contact, and an indication of whether the finger contact was a sliding contact or a non-sliding contact. The touch screen assembly 10 also determines whether one or more fingers made contact simultaneously. If the finger contact was a sliding contact, the processor 14 receives an indication of the direction of the sliding contact.

The software instructions in the memory 16 enable the processor 14 to maintain an association of each character of a complete alphabet (but not necessarily all uppercase and lowercase letters) with a unique finger contact or a unique set of simultaneously-entered two or more finger contacts, and example mappings of finger contacts to characters are provided below. Configured as such, the processor 14 uses the association of characters to finger contacts to recognize character input based on the indicated regions of finger contacts and the indications of sliding/non-sliding contact.

Regarding the finger contacts that the touch screen assembly 10 receives to distinguish between uppercase and lowercase letters, two ways that the embodiment may be implemented are as follows: One way is that every letter of all the uppercase and all the lowercase letters can have an associated unique set of one or simultaneously-entered two or more finger contacts. Another way is that the uppercase and lowercase forms of a letter can be input using the same set of finger contacts, but the present setting of a toggling switch analogous to a "shift key" determines whether the set of finger contacts will be accepted as the uppercase letter or the lowercase letter. A region for the "shift" function may be located above or below the finger contact regions 20a-20e as would be ergonomically useful.

Special characters, such as an exclamation point ("!") or a question mark ("?"), may be accepted by the touch screen assembly 10 analogously to the shift setting. That is, an ergonomically-convenient region may be positioned on the touch-sensitive surface 18 to accept finger contacts that indicate the special characters.

Figure 1B:
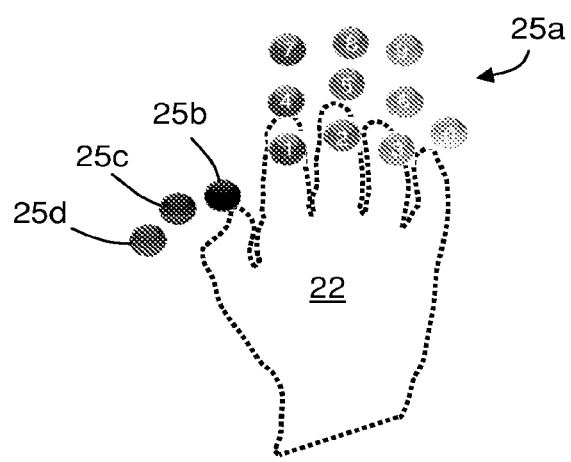

FIG. 1b shows an example of the image of a numeric keypad 25a appearing on the touch-sensitive surface 18 in response to the user contacting a finger contact region 25b (which may or may not be visible, depending on the embodiment). Also shown in FIG. 1b are a finger contact region 25c to cause an image to appear for special character input, and a finger contact region 25d for user-defined functions or characters.

FIG. 2 provides an example of an association of characters of the English alphabet to finger contacts, where for each character one to four fingers are used. In other embodiments, a different number of fingers may be used. As indicated by the key in the figure, as asterisk (*) represents a non-sliding contact, a greater-than sign (>) represents sliding contact to the right, a less-than sign (<) represents sliding contact to the left, a caret (^) represents sliding contact to upward, and a lowercase "v" represents sliding contact to the downward. For example, to input the letter "A," the index finger contacts its associated finger contact region 20b without sliding, and the middle, ring, and little fingers do not contact the touch-sensitive surface 18.

The example character association of FIG. 2 was designed to be easy to memorize by modeling the motions after character patterns. For example, as an "E" is written with three horizontal lines and an "F" is written with two horizontal lines, the associations for "E" and "F" are three and two horizontal sliding contacts, respectively.

In the present embodiment, for each character associated with a sliding contact, the processor recognizes a single non-curved motion as the sliding contact. That is, the present embodiment does not require that, for some characters, the sliding contact will be curved. Accordingly, the software can be written to accept only motions that as straight as the hardware is capable of detecting. However, for practical reasons, the system may be designed to allow for deviations from motions that would be received as "exactly straight." These motions may be regarded as "substantially straight." In still further embodiments, the system may be designed to require curves of specific type, such as an arc from a 12:00 to 3:00 position, as such motion may be an intuitive choice for letters of some languages.

The finger contact regions 20a-20e of the present embodiment are repositionable. Thus, to allow for hands of different sizes and even shapes (e.g., differing proportions of fingers), an individual user may set the locations for the finger contact regions 20a-20e as is best suited for the user's hand 22. When the touch screen assembly 10 is in the mode for positioning the finger contact regions 20a-20e, the touch-sensitive surface 18 senses the simultaneous finger contact of multiple fingers and locates the finger contact regions 20a-20e at the points of contact. Accordingly, even visually-impaired users can easily practice the invention, because they can simply reposition the finger contact regions if they do not remember their locations. This embodiment does not require the user to look at the touch screen assembly when typing.

Nonetheless, for users who want to retain a particular pattern of finger contact regions, the touch screen 12 of the present embodiment offers the user the option to display an image for each finger contact region 20a-20e that indicates the region's location. (For clarity of illustration, the images are not labeled in FIG. 1a.) The touch screen assembly 10 may be programmed so that the images darken when touched and fade when not touched.

Despite the ease of remembering the association of characters of the alphabet to finger contacts, there will still be an initial training phase for the user to facilitate memorization of the association. During the training phase or at any time thereafter, the touch screen assembly 10 may be set so that the touch screen 12 displays images 24 of the characters of an alphabet. These images 24 may subsequently be removed when no longer needed. In response to a finger contact on the touch-sensitive surface at an image of a character, the touch screen 12 indicates the associated unique finger contact or the associated unique set of simultaneously-entered two or more finger contacts. The indications may take the form of a change in color or color intensity combined with arrows to indicate the direction of sliding contact when applicable. The touch screen assembly 10 can also be set so that, in response to one or more finger contacts on the touch-sensitive surface 18 at the finger contact regions 20a-20e that are associated with a character of the alphabet, the touch screen 12 indicates the associated character, for example, by darkening or illuminating more the displayed image of the character.

Figure 3:
FIG. 3 provides examples of fingertips contacting each other to execute computer functions.
Figure 3:
Figure 3:
Figure 3:
Figure 3:

The touch screen assembly 10 may be programmed to accept commands by the user causing two or more fingertips to contact each other while executing a sliding contact on the touch-sensitive surface 18. FIG. 3 shows example sliding contacts that are associated with "copy," "cut," "paste," "undo," and "save" commands.

Although the embodiment of the invention just described is a touch screen assembly, the invention not limited to such embodiment. That is, the input does not need to be received from the same surface that displays visual output. For example, a laptop computer can be configured so that its touchpad receives the finger input of sliding and non-sliding contacts while the output is displayed on the screen. Another example is a PC that has a touch sensitive surface communicating with the PC via a USB connection or via Bluetooth.

The invention is not limited to embodiments in which finger contacts are received on touch-sensitive surfaces of electronic surfaces. For example, inputting characters by finger contacts on the top surface of a desk or table is also within the scope of the invention. Such an example is illustrated in the side view of FIG. 4a and in the top view of FIG. 4b.

Figure 4A:
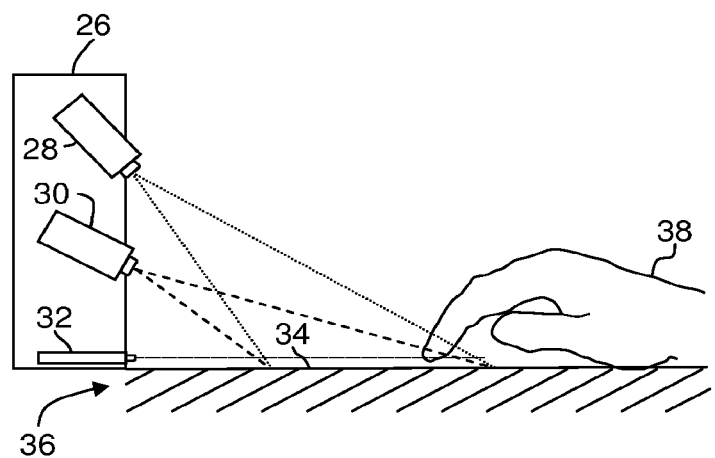
FIGS. 4a and 4b illustrate an example embodiment in which the user's fingers contact a surface that is external to the electronic device receiving the character input.

As shown in FIG. 4a, an instrument casing 26 houses a projection laser 28, an optical sensor 30, and an infrared light source 32. Such combination of components is known in the art, such as that used by Celluon, Inc. to project an image of a keyboard onto a horizontal surface and to determine which projected key image a user touches. Briefly, in this embodiment the projection laser 28 can display images for finger contact regions onto a surface 34 of a desk or table 36 upon which rests the instrument casing 26. The infrared light source 32 projects a beam close to and parallel to the surface in the direction or anticipated direction of the user's hand 38. When the user contacts the surface 34, the optical sensor 30 detects the altered reflections and determines the location of the finger contact relative to the instrument casing 26.

Figure 4B:
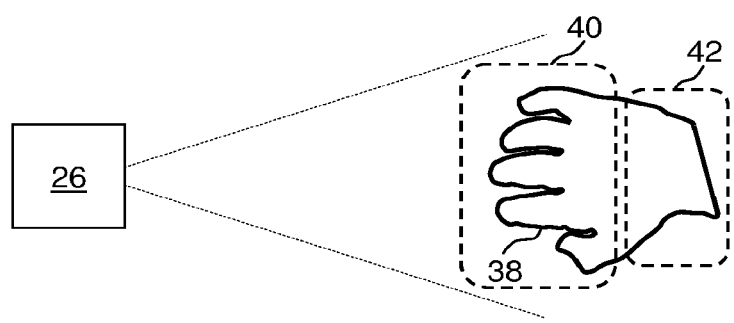

The top view of FIG. 4b shows the top of the desk or table 36 divided in part into a first surface 40 and a second surface 42. The user's fingertips contact the first surface 40, and the heal of the user's hand contacts and rests upon the second surface 42. The first and second surfaces 40, 42 may be regions of the same surface 34 of the desk or table 36, or one of the surfaces may be on a small platform that does not extend to the other surface. As in the first embodiment, the finger contact regions are arranged ergonomically, they can be set appropriately for the individual user, and association of characters to finger contacts can be as intuitive and as easy to remember.

In alternate embodiments, the projection laser 28 may be omitted. The user does not need to see images of the finger contact regions. Instead, the finger contact regions are set when in the proper mode by the user contacting all fingers to be used (usually four or five) on a surface in a procedure analogous to that for setting the positions of the finger contact regions in the first-described embodiment above.

Figure 5:
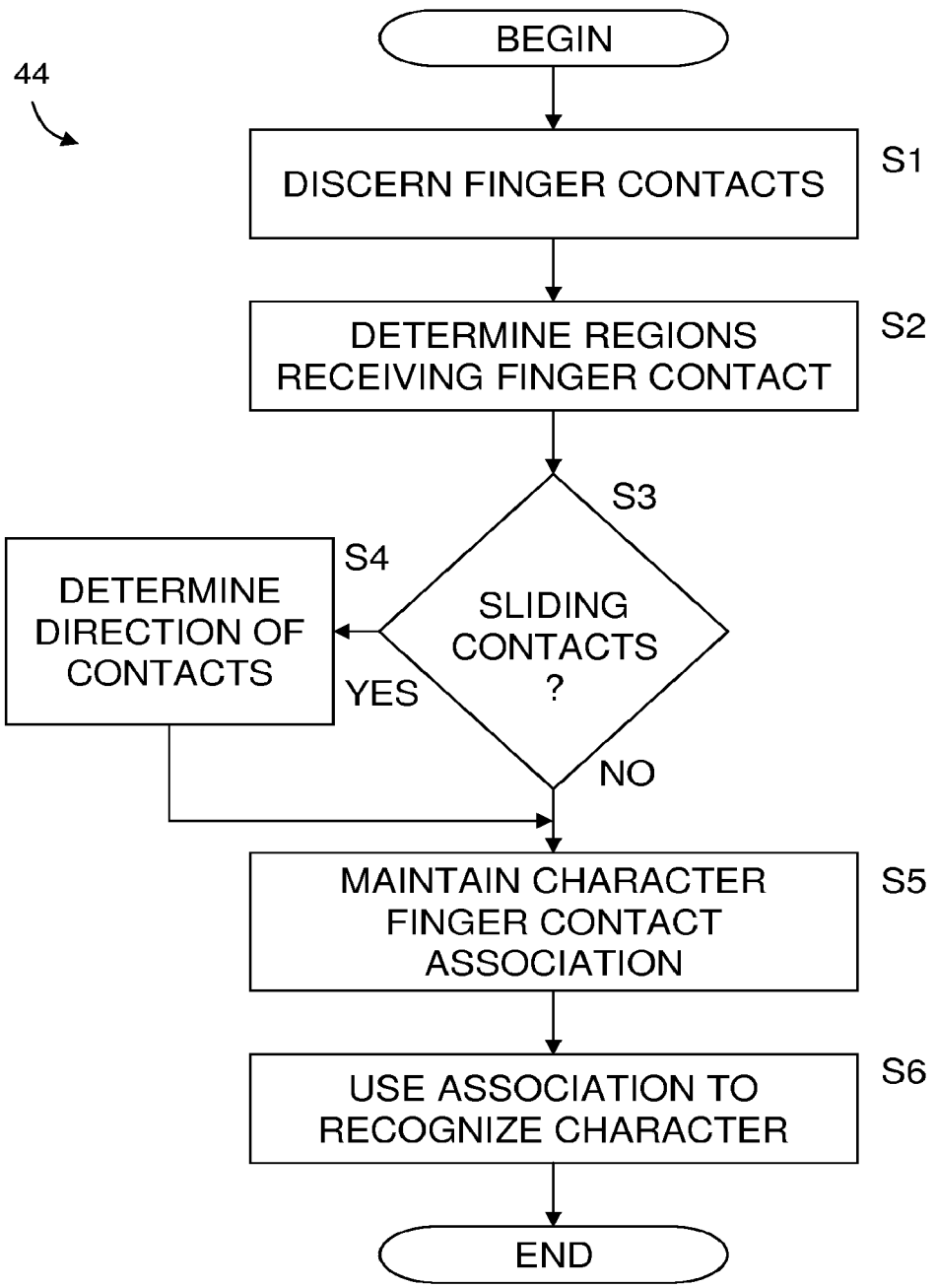
FIG. 5 presents a flowchart used to describe an example of the invention embodied as a method.

The present invention may also be embodied as a method of analyzing human gestures to recognize character input to an electronic device. Such method is described with reference to the flowchart 44 of FIG. 5.

The method begins by discerning finger contacts on finger contact regions of a first surface. (Step S1.) The locations for the finger contact regions may be set by sensing simultaneous finger contact of multiple fingers and locating the finger contact regions at the points of contact.

As non-limiting examples, the first surface may be a touch-sensitive surface of a touch screen, such as the touch-sensitive surface 18 of FIG. 1*a*, a touchpad of a laptop computer, or the first surface 40 of the desk or table 36 of FIGS. 4*a* and 4*b*. Each finger contact region is associated with a separate finger of a user's hand and positioned relative to the other finger contact regions in an ergonomic arrangement that enables the user to simultaneously and comfortably contact all finger contact regions with their associated fingers without moving the heal of the user's hand on or from a second surface that is maintained stationary with respect to the first surface. Examples the second surfaces include the surfaces of the edge of a touch screen assembly, the edge of a laptop computer, a desk or table upon which a touch screen assembly or a laptop computer rests, a tray in front of a user's airline seat, and even the user's thigh, if the touch screen assembly is resting on the user's lap.

The present method may be implemented by displaying an image on the first surface for each finger contact region. Each image would indicate the location of the associated finger contact region on the first surface. The present invention may also be implemented by displaying images of the characters of the alphabet thus enabling one or both of the following options: (1) in response to sensing a finger contact on the first surface at an image of a character, indicating the associated unique finger contact or the associated unique set of simultaneously-entered two or more finger contacts; and (2) in response to one or more finger contacts on the first surface at the finger contact regions that are associated with a character of the alphabet, indicating the associated character. Such indications may be changing the illumination of the finger contacts and characters.

After finger contacts have been discerned in Step S1, the next steps are to determine for each finger contact which finger contact region received the finger contact (Step S2) and to determine whether the finger contact was a sliding or a non-sliding contact (Step S3). The sliding contact of the present embodiment is simple and comfortable in that it does not require the user to move the heal of his/her hand on or from the second surface. If the finger contact is a sliding contact, the direction of the sliding contact is determined. (Step S4.)

Another step of the present method is maintaining an association of each character of a complete alphabet with a unique finger contact or a unique set of simultaneously-discerned two or more finger contacts. (Step S5.) The sliding contacts that are associated with characters so that a single non-curved motion is recognized as the sliding contact associated with a particular character. Alternatively, deviations from exactly straight motions may be tolerated.

With the association of characters to finger contacts established and maintained, this association is used to recognize character input based on the indicated regions of finger contacts and the indications of sliding/on-sliding contact. (Step S6.)

The present invention may also be embodied as a machine readable storage medium containing instructions that when executed cause a processor of an electronic device to discern input characters. The storage medium could be many different types of non-transitory memory, such as a hard disk drive, a flash memory SSD, a compact disk, a DVD, USB (Universal Serial Bus) flash drive, and the like. The storage media may be for example part of the electronic devices described above, and the instructions, when executed, may perform for example the methods described above.

The instructions, when executed, cause a processor to receive an indication of finger contact on finger contact regions on a first surface, such as a touch screen. Each finger contact region is associated with a separate finger of the user's hand. Also, each finger contact region is positioned relative to the other finger contact regions in an ergonomic arrangement enabling the user to simultaneously contact all finger contact regions with the associated fingers without moving the heal of his/her hand on or from a second surface that is maintained stationary with respect to first surface.

The instructions stored within the storage medium also enable the processor to receive indications of which finger contact regions receive finger contacts and whether the finger contacts were sliding or non-sliding contacts. The sliding contacts are the type that does not require the user to move the heal of his/her hand on or from the second surface. The processor also receives indications of the directions of the sliding contacts. The sliding contacts are such that a single non-curved motion is recognized as the sliding contact associated with a particular character. The instruction may require that the non-curved motion is as straight as the associated hardware can sense, or deviations from exactly straight motions may be tolerated as is practical or preferable for a given application.

Analogously to previously-described embodiments, a processor executing the instructions stored in the storage medium of the present embodiment maintains an association of each character of a complete alphabet with a unique finger contact or a unique set of simultaneously-entered two or more finger contacts. The processor then uses the association of characters to finger contacts to recognize character input based on the indicated regions of finger contacts and the indications of sliding/non-sliding contact.

Variations of the present storage medium are within the scope of the invention. For example, instructions may be stored therein that when executed cause the processor to set the locations for the finger contact regions by sensing on the first surface the simultaneous finger contact of multiple fingers and then locating the finger contact regions at the points of contact. As another example, the stored instruction may cause the processor to displaying an image for each finger contact region such that each image indicates the location of the associated finger contact region on the touch screen. The displaying of the image may be combined with also displaying images of the characters of an alphabet, and then either or both of: (1) in response to sensing a finger contact on the touch-sensitive surface at an image of a character, indicating the associated unique finger contact or the associated unique set of simultaneously-entered two or more finger contacts; or (2) in response to one or more finger contacts on the touch-sensitive surface at the finger contact regions that are associated with a character of the alphabet, indicating the associated character.

Having thus described exemplary embodiments of the invention, it will be apparent that various alterations, modifications, and improvements will readily occur to those skilled in the art. Alternations, modifications, and improvements of the disclosed invention, though not expressly described above, are nonetheless intended and implied to be within spirit and scope of the invention. Accordingly, the foregoing discussion is intended to be illustrative only; the invention is limited and defined only by the following claims and equivalents thereto.

We claim:

1. A method of inputting control commands comprising:
   (i) a processor sensing the locations of a plurality of fingers over a surface including the locations of at least a first finger, a second finger, and a third finger of the user's hand and positioning a first finger location region including the sensed location of the first finger, a second finger location region including the sensed location of the second finger, and a third finger location region including the sensed location of the third finger; wherein a plurality of control commands are each associated with a unique sliding motion originating with one or more of the finger location regions, and wherein each finger location region is a unique region of the surface;
   (ii) maintaining an association of each of the plurality of control commands with a unique combination of sliding motions and/or non-sliding contacts originating with one or more of the finger location regions, including one control command associated with a sliding motion originating with only the first finger location region and a different control command associated with only a sliding motion with only the second finger location region; and
   (iii) following the positioning of the finger location regions, entering a first control command by discerning a control command input sliding motion at only the first finger location region, determining the direction of the sliding motion, and identifying the first control command based on the finger location region having the motion and the direction of the sliding motion.

2. The method of claim 1, wherein the method includes a step of entering a second control command different from the first control command by discerning a second control command sliding motion of only the second finger location region; wherein the second control command sliding motion is the same as the sliding direction of the first control command sliding motion; and identifying the second control command based on the finger location region the second control command sliding motion originates and the direction of the sliding motion.

3. The method of claim 1, wherein the step of identifying the first control command includes recognizing the first control command using the association of control commands to finger location regions and sliding direction.

4. The method of claim 1, wherein the control command input sliding motion is a single non-curved motion.

5. The method of claim 1, wherein the association of control commands includes 10 or more different control commands associated with different sliding motions and/or non-sliding contacts of three fingers.

6. The method of claim 1, wherein the association of control commands includes a first control command associated with a non-sliding contact for a first time interval and a second control command associated with a non-sliding contact for a second time interval, wherein the second time interval is a relatively long time compared with the first timer interval.

7. An electronic device comprising:
   a processor;
   a touch screen having a touch sensitive surface; and
   a memory storing instructions that, when executed by the processor, cause the processor to:
   (i) upon sensing the locations of a plurality of fingers over the touch sensitive surface including the locations of at least a first finger, a second finger, and a third finger of the user's hand, defining a first finger location region including the sensed location of the first finger, a second finger location region including the sensed location of the second finger, and a third finger location region including the sensed location of the third finger; wherein a plurality of control commands are each associated with a unique sliding motion originating with one or more of the finger location regions, and wherein each finger location region is a unique region of the surface;
   (ii) maintaining an association of each of the plurality of control commands with a unique combination of sliding motions and/or non-sliding contacts originating with one or more of the finger location regions, including one control command associated with a sliding motion originating with only the first finger location region and a different control command associated with only a sliding motion with only the second finger location region; and
   (iii) following the positioning of the finger location regions, upon sensing a command input sliding motion originating at only the first finger location region, identifying a first control command associated with the sliding motion.

8. The device of claim 7, wherein each finger location region is spaced apart from the other finger location regions.

9. The device of claim 7, wherein the processor is connected to an electronic or mechanical device and the processor controls the electronic or mechanical device based on the first control command.

10. The device of claim 7, wherein the processor is connected to an electronic or mechanical device and the processor sends the first control command to a processor that controls the electronic or mechanical device.

11. The device of claim 7, wherein the touch sensitive surface is also a display.

12. The device of claim 7, wherein the control command input sliding motion is a single non-curved motion.

13. The device of claim 7, wherein the association of control commands includes 10 or more different control commands.

14. The device of claim 13, wherein the association of control commands includes 15 or more different control commands.

15. The device of claim 7, wherein the association of control commands includes a first control command associated with a non-sliding contact for a first time interval and a second control command associated with a non-sliding contact for a second time interval, wherein the second time interval is longer than the first timer interval.

16. A machine readable storage medium containing instructions that when executed cause a processor of an electronic device to discern input commands by:
   (i) sensing the locations of a plurality of fingers over a surface including the locations of at least a first finger, a second finger, and a third finger of the user's hand and positioning a first finger location region including the sensed location of the first finger, a second finger location region including the sensed location of the second finger, and a third finger location region including the sensed location of the third finger; wherein a plurality of control commands are each associated with a unique sliding motion originating with one or more of the finger location regions, and wherein each finger location region is a unique region of the surface;

(ii) maintaining an association of each of the plurality of control commands with a unique combination of sliding motions and/or non-sliding contacts originating with one or more of the finger location regions, including one control command associated with a sliding motion originating with only the first finger location region and a different control command associated with only a sliding motion with only the second finger location region; and (iii) following the positioning of the finger location regions, entering a first control command by discerning a control command input sliding motion at only the first finger location region, determining the direction of the sliding motion, and identifying the first control command based on the finger location region having the motion and the direction of the sliding motion.

17. The machine readable storage medium of claim 16, wherein the machine readable storage medium includes instructions for entering a second control command different from the first control command by discerning a second control command sliding motion of only the second finger location region; wherein the second control command sliding motion is the same as the sliding direction of the first control command sliding motion; and identifies the second control command based on the finger location region the second control command sliding motion originates and the direction of the sliding motion.

18. The machine readable storage medium of claim 17, wherein the identifying of the first control command includes recognizing the first control command using the association of control commands to finger location regions and sliding direction.

19. The machine readable storage medium of claim 17, wherein the control command input sliding motion is a single non-curved motion.

20. The machine readable storage medium of claim 17, wherein the association of control commands includes 10 or more different control commands.

21. The method of claim 1,
wherein the step of identifying the first control command includes recognizing the first control command using the association of control commands to finger location regions and sliding direction, and the control command input sliding motion is a single non-curved motion;
wherein the method includes a step of entering a second control command different from the first control command by discerning a second control command sliding motion of only the second finger location region; wherein the second control command sliding motion is the same as the sliding direction of the first control command sliding motion; and identifying the second control command based on the finger location region the second control command sliding motion originates and the direction of the sliding motion;
wherein the surface is a touch sensitive surface of a touch screen; and
wherein the association of control commands includes 10 or more different control commands associated with different sliding motions and/or non-sliding contacts.

22. The machine readable storage medium of claim 16,
wherein the identifying of the first control command includes recognizing the first control command using the association of control commands to finger location regions and sliding direction and the control command input sliding motion is a single non-curved motion;
wherein the machine readable storage medium includes instructions for entering a second control command different from the first control command by discerning a second control command sliding motion of only the second finger location region; wherein the second control command sliding motion is the same as the sliding direction of the first control command sliding motion; and identifies the second control command based on the finger location region the second control command sliding motion originates and the direction of the sliding motion;
wherein the surface is a touch sensitive surface of a touch screen; and
wherein the association of control commands includes 10 or more different control commands associated with different sliding motions and/or non-sliding contacts.

23. The machine readable storage medium of claim 22, wherein each finger location region is spaced apart from the other finger location regions.

24. The device of claim 7,
wherein the processor is connected to an electronic or mechanical device and
i) the processor controls the electronic or mechanical device based on the first control command; or
ii) the processor sends the first control command to a processor that controls the electronic or mechanical device;
wherein the control command input sliding motion is a single non-curved motion; and
wherein the association of control commands includes 10 or more different control commands.

25. The device of claim 24,
wherein the identifying of the first control command includes recognizing the first control command using the association of control commands to finger location regions and sliding direction and the control command input sliding motion is a single non-curved motion; and
wherein the machine readable storage medium includes instructions for entering a second control command different from the first control command by discerning a second control command sliding motion of only the second finger location region; wherein the second control command sliding motion is the same as the sliding direction of the first control command sliding motion; and identifies the second control command based on the finger location region the second control command sliding motion originates and the direction of the sliding motion.

* * * * *